(12) United States Patent  
Chen et al.

(10) Patent No.: US 12,308,692 B2  
(45) Date of Patent: May 20, 2025

(54) BMS SLEEP WAKE-UP CIRCUIT AND METHOD, BMS, AND ELECTRIC DEVICE

(71) Applicant: CONTEMPORARY AMPEREX TECHNOLOGY (HONG KONG) LIMITED, Hong Kong (CN)

(72) Inventors: Weijie Chen, Fujian (CN); Weiqiang Li, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/954,813

(22) Filed: Nov. 21, 2024

(65) Prior Publication Data

US 2025/0079880 A1 Mar. 6, 2025

Related U.S. Application Data

(63) Continuation of application No. PCT/CN2023/121691, filed on Sep. 26, 2023.

(30) Foreign Application Priority Data

Oct. 8, 2022 (CN) .......................... 202211221510.2

(51) Int. Cl.
*H02J 9/00* (2006.01)
*B60L 53/16* (2019.01)
*H02J 7/00* (2006.01)

(52) U.S. Cl.
CPC .............. *H02J 9/005* (2013.01); *B60L 53/16* (2019.02); *H02J 7/00036* (2020.01); *H02J 7/00302* (2020.01); *H02J 7/0036* (2013.01)

(58) Field of Classification Search
CPC ....................................................... H02J 9/005
(Continued)

(56) References Cited

U.S. PATENT DOCUMENTS 11,824,170 B2 * 11/2023 He ........................... H02J 9/005
12,142,961 B2 * 11/2024 Fiebrich .................. H02J 7/342
(Continued)

FOREIGN PATENT DOCUMENTS

CN 108958119 A 12/2018
CN 109094392 A 12/2018
(Continued)

OTHER PUBLICATIONS

International Search Report and Written Opinion mailed on Dec. 11, 2023, received for PCT Application PCT/CN2023/121691, filed on Sep. 26, 2023, 20 pages including English Translation.
(Continued)

*Primary Examiner* — Jerry D Robbins
(74) *Attorney, Agent, or Firm* — XSENSUS LLP

(57) ABSTRACT

This application discloses a BMS sleep wake-up circuit and method, a BMS, and an electric device. The BMS sleep wake-up circuit is provided with an enabling circuit. When a charging device is plugged in, the wake-up chip can be enabled through a first enabling signal to activate to wake up a BMS, and a control circuit outputs a self-locking signal, so that the wake-up chip keeps waking up the BMS. Additionally, after being activated, a mode in which the wake-up chip is enabled to activate is changed to a mode in which the wake-up chip is enabled through a second enabling signal to activate to wake up the BMS, so that when the charging device remains plugged in, after the self-locking signal is canceled, the wake-up chip is turned off, allowing the BMS to enter a sleeping state.

15 Claims, 3 Drawing Sheets

(58) Field of Classification Search
USPC .......................................................... 320/134
See application file for complete search history.

(56) References Cited

U.S. PATENT DOCUMENTS

| | | | | |
|---|---|---|---|---|
| 2010/0052615 | A1* | 3/2010 | Loncarevic | H02J 7/0014 320/118 |
| 2014/0333362 | A1* | 11/2014 | Zhu | H03K 3/012 327/225 |
| 2018/0208066 | A1* | 7/2018 | Rao | H02J 7/0036 |
| 2019/0263340 | A1* | 8/2019 | Harvey | H02P 3/06 |
| 2020/0009981 | A1* | 1/2020 | Kim | B60L 50/60 |
| 2020/0083722 | A1* | 3/2020 | Zhang | G01R 31/382 |
| 2021/0119549 | A1* | 4/2021 | Wang | H02M 3/33538 |
| 2022/0121262 | A1* | 4/2022 | Wang | B60L 53/22 |

FOREIGN PATENT DOCUMENTS

| | | | |
|---|---|---|---|
| CN | 109774534 | A | 5/2019 |
| CN | 110165738 | A | 8/2019 |
| CN | 111293760 | A | 6/2020 |
| CN | 112009306 | A | 12/2020 |
| CN | 112706653 | A | 4/2021 |
| CN | 113147479 | A | 7/2021 |
| CN | 113525124 | A | 10/2021 |
| CN | 114701398 | A | 7/2022 |
| CN | 115837860 | A | 3/2023 |
| WO | 2020/074167 | A1 | 4/2020 |
| WO | 2021/021833 | A1 | 2/2021 |

OTHER PUBLICATIONS

Office Action mailed on Apr. 13, 2024, received for CN Application 202211221510.2, 16 pages including English Translation.

Notice of Allowance mailed on Sep. 3, 2024, received for CN Application 202211221510.2, 8 pages including English Translation.

* cited by examiner

BMS SLEEP WAKE-UP CIRCUIT AND METHOD, BMS, AND ELECTRIC DEVICE

CROSS-REFERENCE TO RELATED APPLICATIONS

This application is a continuation of International Application No. PCT/CN2023/121691, filed on Sep. 26, 2023, which claims the priority to the Chinese Patent Application No. 202211221510.2, filed with China National Intellectual Property Administration on Oct. 8, 2022, and entitled "BMS SLEEP WAKE-UP CIRCUIT AND METHOD, BMS, AND ELECTRIC DEVICE", each are incorporated herein by reference in their entirety.

TECHNICAL FIELD

This application relates to the field of battery management, and specifically to a BMS sleep wake-up circuit and method, a BMS, and an electric device.

BACKGROUND

Charging is an indispensable function for new energy electric vehicle products. For a charging interface of a national standard charging gun (such as AC_CP interface of an alternating current charging gun) from which a high level is input, the vehicle design requires that the charging gun should be able to wake up the battery management system (Battery Management System, BMS) after being plugged into the vehicle. Engineers focus on the plug-in wake-up function during design, and often overlook the need to support BMS to enter sleep while keeping the charging gun plugged. In this case, if the charging is completed or stopped without unplugging the charging gun, the BMS cannot enter sleep, thus increasing the lead-acid power consumption of the vehicle.

SUMMARY

In view of the preceding problem, embodiments of this application provide a BMS sleep wake-up circuit and method, a BMS, and an electric device, which can solve the problem that a BMS cannot enter sleep unless a charging gun is unplugged.

According to a first aspect, an embodiment of this application provides a BMS sleep wake-up circuit, including:
  a detection port configured to be connected to a charging device when the charging device is plugged in;
  an enabling circuit connected to the detection port and a wake-up chip of a BMS, and configured to generate a first enabling signal based on a first level signal provided by the charging device to enable the wake-up chip to activate to wake up the BMS in a sleeping state, where the activated wake-up chip is configured to switch from being enabled and activated by the first enabling signal to being enabled and activated by a second enabling signal; and
  a control circuit configured to, after the BMS is awakened, output a self-locking signal to the wake-up chip to maintain the wake-up chip in an activated state, and further configured to, when a sleep signal is received, stop outputting the self-locking signal to turn off the wake-up chip, allowing the BMS to enter a sleeping state.

In the technical solution of this embodiment of this application, when the charging device is plugged in, the enabling circuit is configured to use the first enabling signal to enable the wake-up chip to activate to wake up the BMS in sleeping state (that is, activating), and the control circuit outputs the self-locking signal to enable the wake-up chip to keep waking up the BMS. Additionally, after the wake-up chip is activated, the activating mode of the wake-up chip is changed to be enabled by the second enabling signal to activate the BMS in a sleeping state, so that under the condition that the charging device remains plugged in, the wake-up chip cannot be awakened by the original first enabling signal, and after the self-locking signal is canceled, the wake-up chip is turned off, allowing the BMS to enter the sleeping state. This solves the problem in related art that a BMS cannot enter sleep unless a charging device is unplugged, and allows the wake-up chip triggered by either an edge or a level to enable the BMS to enter sleep while the charging device remains plugged in, thereby reducing lead-acid consumption of the battery.

In some embodiments, the control circuit or the wake-up chip is further configured to configure the activated wake-up chip to switch from being enabled and activated by the first enabling signal to being enabled and activated by the second enabling signal.

The technical solution of this embodiment of this application provides two ways of configuring an enabled activation mode of the wake-up chip: one is to configure the enabled activation mode of the wake-up chip through the control circuit, and the other is to configure the enabled activation mode of the wake-up chip by the wake-up chip itself, improving the scalability and controllability of the system.

In some embodiments, the BMS sleep wake-up circuit further includes:
  a sampling circuit connected to the detection port, where the sampling circuit is configured to output an unplugging signal when it is detected that the detection port is not connected to the charging device; and
  the control circuit or the wake-up chip is further configured to configure, based on the unplugging signal, the wake-up chip to recover from being enabled and activated by the second enabling signal to being enabled and activated by the first enabling signal.

In the technical solution of this embodiment of this application, a sampling circuit is used to collect a collection signal of the detection port to determine whether the charging device is plugged in or unplugged. After it is detected that the charging device is unplugged, the control circuit or the wake-up chip itself changes the enabled activation mode of the wake-up chip to a mode when the charging device is not plugged in, and after the charging device is be plugged in again, generates the first enabling signal to wake up the BMS in a sleeping state again, providing system reliability.

In some embodiments, the enabling circuit includes:
  a detection module connected to the detection port, and configured to output a first detection signal based on the first level signal provided by the charging device; and
  an enabling module connected to the detection module, and configured to generate the first enabling signal based on the first detection signal and output the first enabling signal to the wake-up chip.

In the technical solution of this embodiment of this application, an embodiment of the enabling circuit is provided. The detection module detects the first level signal provided by the charging device, and the enabling module activates the wake-up chip based on the first level signal to wake up the BMS in a sleeping state. The circuit is simple and reliable.

In some embodiments, the detection module includes a first switching transistor and a first resistor. A control terminal of the first switching transistor is connected to the detection port, a first terminal of the first switching transistor is connected to a first power source through the first resistor, a second terminal of the first switching transistor is grounded, and the first terminal of the first switching transistor is connected to the enabling module.

In the technical solution of this embodiment of this application, an implementation of the detection module is provided. The circuit has a simple structure, reliability, and low cost.

In some embodiments, the enabling module includes a second switching transistor and a second resistor. A control terminal of the second switching transistor is connected to the detection module, a first terminal of the second switching transistor is connected to a second power source, a second terminal of the second switching transistor is grounded through the second resistor, and the second terminal of the second switching transistor is configured to be connected to a first enabling pin of the wake-up chip.

In the technical solution of this embodiment of this application, an implementation of the enabling module is provided. The circuit has a simple structure, reliability, and low cost.

In some embodiments, the control circuit includes one of control chips in the BMS, and a locking pin of the control chip is connected to a second enabling pin of the wake-up chip to provide the self-locking signal.

In the technical solution of this embodiment of this application, the enabling circuit and the control circuit are connected to different pins of the wake-up chip, so that the control of the enabling signal to the wake-up chip and the control of the self-locking signal to the wake-up chip are independent of each other. This enables the activated wake-up chip to be locked by the self-locking signal output by the controller. The enabled activation mode of the wake-up chip is changed, so that the wake-up chip can be turned off after the self-locking signal is canceled to achieve sleep, thereby reducing lead-acid consumption of the battery.

In some embodiments, the wake-up chip is a power source chip for supplying power to the BMS, or a control chip for controlling the BMS to sleep or wake up.

In some embodiments, the first enabling signal and the second enabling signal are level signals or edge signals with different states.

In the technical solution of this embodiment of this application, the power source chip triggered by a level and/or an edge can be compatible with the control chip, so that the BMS triggered by a level and/or an edge can also be awakened and enter sleep when the charging device is plugged in.

In some embodiments, the control circuit and the wake-up chip are a same control chip. This facilitates the system settings.

According to a second aspect, an embodiment of this application provides a BMS sleep wake-up method, including:
 when a charging device is plugged in, generating a first enabling signal based on a first level signal provided by the charging device to enable a wake-up chip of a BMS to activate to wake up the BMS in a sleeping state;
 generating a self-locking signal to maintain the wake-up chip in an activated state;
 configuring the wake-up chip to switch from being enabled and activated by the first enabling signal to being enabled and activated by the second enabling signal; and
 if a sleep signal is received, stopping outputting the self-locking signal to turn off the wake-up chip, allowing the BMS to enter a sleeping state.

In the technical solution of this embodiment of this application, when the charging device is plugged in, the BMS may generate the first enabling signal based on the first level signal provided by the charging device to enable the wake-up chip to activate to wake up the BMS in a sleeping state, and output the self-locking signal to keep the wake-up chip waking up the BMS. Additionally, after the wake-up chip is activated, an enabled activation mode of the wake-up chip is changed to be enabled by the second enabling signal to activate the wake-up chip to wake up the BMS in a sleeping state, so that when the charging device remains plugged in, the wake-up chip cannot be awakened by the original first enabling signal, and after the self-locking signal is canceled, the wake-up chip is turned off, allowing the BMS to enter the sleeping state. This solves the problem that the BMS cannot enter a sleeping state unless the charging device is unplugged, and allows the wake-up chip triggered by either an edge or a level to enable the BMS to enter sleep while the charging device remains plugged in, thereby reducing the lead-acid consumption of the battery.

In some embodiments, the BMS sleep wake-up circuit further includes:
 generating an unplugging signal when it is detected that the charging device is unplugged; and
 configuring, based on the unplugging signal, the wake-up chip to switch from being enabled and activated by the second enabling signal to being enabled and activated by the first enabling signal.

In the technical solution of this embodiment of this application, a connection signal of the detection port is detected to determine whether the charging device is plugged in or unplugged. After it is detected that the charging device is unplugged, the enabled activation mode of the wake-up chip is changed to a mode when the charging device is not plugged in, and after the charging device is plugged in again, the first enabling signal is generated to wake up the BMS in a sleeping state again, providing system reliability.

In some embodiments, the first enabling signal and the second enabling signal are level signals or edge signals.

In the technical solution of this embodiment of this application, the BMS can support being triggered by a level and/or an edge, so that the level-triggered and/or edge-triggered BMS can also be awakened and enter sleep when the charging device is plugged in.

According to a third aspect, an embodiment of this application provides a BMS, including the foregoing BMS sleep wake-up circuit.

In the technical solution of this embodiment of this application, when a charging device is plugged in, a level signal provided by the charging device is used to enable the wake-up chip to activate to wake up the BMS in a sleeping state, and the awakened BMS outputs a self-locking signal to keep awake. Additionally, after being activated, the enabled activation mode is changed so that the BMS cannot be awakened by the original enabling signal when the charging device remains plugged in, and can enter a sleeping state after the self-locking signal is canceled, solving the problem that the BMS cannot enter a sleeping state unless the charging device is unplugged, thereby reducing the lead-acid consumption of the battery.

According to a fourth aspect, an embodiment of this application provides an electric device, including a battery and the foregoing BMS.

In the technical solution of this embodiment of this application, when a charging device is plugged in, the electric device can use a level signal provided by the charging device to enable the wake-up chip to activate to wake up the BMS in a sleeping state of the electric device, and the awakened BMS outputs a self-locking signal to keep awake. Additionally, after being activated, the enabled activation mode is changed so that the BMS cannot be awakened by the original enabling signal when the charging device remains plugged in, and can enter a sleeping state after the self-locking signal is canceled, solving the problem that the BMS cannot enter a sleeping state unless the charging device is unplugged, thereby reducing the lead-acid consumption of the battery.

The foregoing description is merely an overview of the technical solution of this application. To more clearly understand the technical means in this application so that they can be implemented according to the content of the specification, and to make the foregoing and other objectives, features, and advantages of this application more obvious and easier to understand, the following describes specific embodiments of this application.

BRIEF DESCRIPTION OF DRAWINGS

Persons of ordinary skill in the art can clearly understand various other advantages and benefits by reading the detailed description of the preferred embodiments below. The accompanying drawings are merely intended to illustrate the preferred embodiments and are not intended to limit this application. In addition, in all the accompanying drawings, same parts are denoted by same reference signs. In the accompanying drawings.

Figure 1:
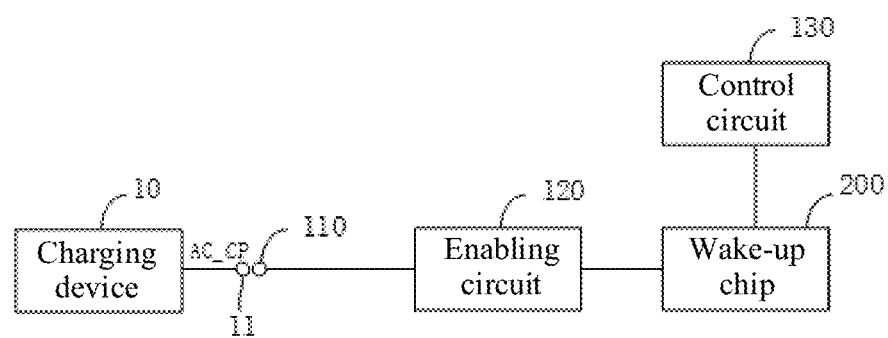
FIG. 1 is a module diagram of a BMS sleep wake-up circuit according to some embodiments of this application.

Reference signs in specific embodiments are as follows:
charging device 10; communication interface 11; detection port 110; enabling circuit 120; detection module 122; enabling module 124; control circuit 130; sampling circuit 140; wake-up chip 200;
first switching transistor Q1; second switching transistor Q2; first resistor R1; second resistor R2; current-limiting resistor R3; first potential-divider resistor R11, second potential-divider resistor R12; first enabling pin EN1; second enabling pin EN2; first power source V1; and second power source V2.

DESCRIPTION OF EMBODIMENTS

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include/comprise" and "have" and any other variations thereof in the specification, claims, and brief description of drawings of this application are intended to cover non-exclusive inclusions.

In the description of the embodiments of this application, the technical terms "first", "second" and the like are merely intended to distinguish between different objects, and shall not be understood as any indication or implication of relative importance or any implicit indication of the number, specific sequence, or primary-secondary relationship of the technical features indicated. In the description of the embodiments of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in this specification does not necessarily refer to the same embodiment or an independent or alternative embodiment that is exclusive of other embodiments. Persons skilled in the art explicitly and implicitly understand that the embodiments described herein may be combined with other embodiments.

In the descriptions of the embodiments of this application, the term "and/or" is only an associative relationship for describing associated objects, indicating that three relationships may be present. For example, A and/or B may indicate the following three cases: presence of only A, presence of both A and B, and presence of only B. In addition, a character "/" in this specification generally indicates an "or" relationship between contextually associated objects.

In the descriptions of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the means or components mentioned must have specific orientations or must be constructed or manipulated according to specific orientations, and therefore shall not be construed as any limitation on the embodiments of this application.

In the description of the embodiments of this application, unless otherwise specified and defined explicitly, the technical terms "mounting", "connection", "joining", and "fastening" should be understood in their general senses. For example, they may refer to a fixed connection, a detachable connection, or an integral connection, may refer to a mechanical connection or an electrical connection, and may refer to a direct connection, an indirect connection via an intermediate medium, an internal communication between two elements, or an interaction between two elements. Persons of ordinary skill in the art can understand specific meanings of these terms in this application as appropriate to specific situations.

A charging wake-up function is often used in conjunction with an effective edge-triggered wake-up function of a wake-up chip. However, currently, many application chips do not support edge wake-up. Based on this, the inventive concept of this application is to allow a wake-up chip used in a charging wake-up function to have a basic level wake-up function, and certainly also to allow it to be compatible with an effective edge-triggered wake-up function. Specifically, the embodiments of this application mainly introduce an inventive concept for an interface of a charging device (such as a charging gun) being a BMS interface circuit from which a high-level signal is input, supporting wake-up upon connection, and also supporting sleep without unplugged. A wake-up channel of the wake-up chip used (such as a power source chip or other chips with wake-up functions) needs to have only a level-triggered or edge-triggered wake-up function.

For example, new energy electric vehicle products support waking up by plugging the charging gun into the interface of the charging gun being a communication interface (such as the AC_CP interface that provides power transmission signals) from which a high level is input, and also supports, under the control of the BMS, achieving sleep without unplugging the gun while the charging gun remains plugged in, so that after charging is completed or stopped, the BMS can enter sleep, saving energy and reducing the lead-acid consumption of the entire vehicle.

Referring to FIG. 1. FIG. 1 is a module diagram of a BMS sleep wake-up circuit according to some embodiments of this application. The BMS sleep wake-up circuit includes a detection port 110, an enabling circuit 120, and a control circuit 130.

The detection port 110 is configured to be connected to a charging device 10 when the charging device 10 is plugged in. The enabling circuit 120 is connected to the detection port 110 and a wake-up chip 200 of a BMS, and generates a first enabling signal based on a first level signal provided by the charging device 10 to enable the wake-up chip 200 to activate to wake up the BMS in a sleeping state. The activated wake-up chip 200 is configured to switch from being enabled and activated by the first enabling signal to being enabled and activated by the second enabling signal. The control circuit 130 is configured to, after the BMS in a sleeping state is awakened, output a self-locking signal to the wake-up chip 200 to maintain the wake-up chip 200 in an activated state, and further configured to, when a sleep signal is received, stop outputting the self-locking signal to turn off the wake-up chip 200, allowing the BMS to enter a sleeping state, solving the problem in related art that the BMS cannot enter a sleeping state unless the charging device 10 is unplugged, thereby reducing lead-acid consumption of the battery.

The charging device 10 is, for example, a charging gun or a common charging adapter available on the market. A communication interface 11 of the charging device 10 may be an AC_CP interface of the charging gun or a communication interface of the charging adapter. A charging gun is used as an example. After the charging gun is connected to the charging interface, a power transmission signal output to a charging interface through the communication interface 11 (that is, AC_CP interface) first enters a connection stage of the charging gun. During this stage, a first rising edge appears and maintains a high level for a preset duration. The power transmission signal then enters a pulse-width modulation (that is, PWM) stage of data communication. During the pulse-width modulation stage, the charging gun outputs charging power to the charging interface. After charging is completed, the power transmission signal returns to a high level.

It can be understood that when the charging gun is plugged in, the detection port 110 is connected to the communication interface 11 of the charging device 10, and receives the first level signal provided by the communication interface 11 of the charging device 10, for example, a high level. Conversely, when the charging device 10 is not plugged in, the detection port 110 is at a low level, which may also be referred to as a second level signal.

The first enabling signal generated by the enabling circuit 120 based on the first level signal is a high level. It can be understood that the first enabling signal further includes a rising edge. In this case, the wake-up chip 200 of the BMS may be effectively enabled and activated by a high level or may be effectively enabled and activated by a rising edge. The control circuit 130 is part of the BMS. When the BMS is awakened from the sleeping state, the control circuit 130 is activated. Therefore, after the wake-up chip 200 is activated, the BMS in sleeping state is awakened. The control circuit 130 outputs the self-locking signal to maintain the wake-up chip 200 in an activated state, so that the wake-up chip 200 keeps waking up the BMS for working, thus completing the wake-up process of the BMS in sleeping state.

Thereafter, for example, when charging is completed or stopped, it is desired to reduce the lead-acid consumption of the battery but the wake-up chip 200 is effectively triggered by a level, and a power transmission signal, that is, a signal provided by the communication interface 11 to the detection port 110, is still in a high-level state, even if the output of the self-locking signal is stopped, the wake-up chip 200 is still in the state of being enabled and activated by the first enabling signal and cannot allow the BMS to enter the sleeping state. Therefore, to allow the BMS to enter sleep while the charging device 10 is plugged in and to reduce the lead-acid consumption of the battery, a triggering condition for the enabled activation of the wake-up chip 200 is reconfigured from the first enabling signal (that is, high level) being effective to a second enabling signal (that is, low level) being effective. This allows the wake-up chip 200 to be turned off by stopping the output of the self-locking signal, allowing the BMS to enter the sleeping state. When the wake-up chip 200 is effectively triggered by an edge and charging is completed or stopped, the wake-up chip 200 can also be turned off by stopping the output of the self-locking signal, allowing the BMS to enter the sleeping state.

The enabling circuit 120 detects the first level signal to determine whether the charging device 10 is plugged in. When the charging device 10 is plugged in, the enabling circuit 120 outputs the first enabling signal to enable the wake-up chip 200 to activate to wake up the BMS in a sleeping state, and the control circuit 130 outputs the self-locking signal to keep the wake-up chip 200 waking up the BMS. Additionally, after the wake-up chip 200 is activated, the enabled activation mode of the wake-up chip 200 is changed to be enabled by the second enabling signal, so that when the charging device 10 remains plugged in, the wake-up chip 200 cannot be awakened by the first enabling signal generated based on the first level signal that always exists. In this case, after the self-locking signal is canceled, the wake-up chip 200 is turned off, allowing the BMS to enter the sleeping state. This solves the problem that the BMS cannot enter a sleeping state unless the charging device 10 is unplugged, and allows the wake-up chip 200 triggered by either an edge or a level to enable the BMS to enter sleep while the charging device 10 remains plugged in, thereby reducing the lead-acid consumption of the battery.

In some embodiments, the control circuit 130 or the wake-up chip 200 is further configured to configure the activated wake-up chip 200 to switch from being enabled and activated by the first enabling signal to being enabled and activated by the second enabling signal.

This embodiment provides two ways of configuring the enabled activation mode of the wake-up chip 200: one is to configure the enabled activation mode of the wake-up chip 200 through the control circuit 130 under the condition that the control circuit 130 is connected to the wake-up chip 200, and the other is to configure the enabled activation mode by the wake-up chip 200 itself. After the wake-up chip 200 effectively triggered by a level is enabled and activated, to allow the BMS to enter the sleep state while the charging device 10 is not unplugged, the enabled activation mode of the wake-up chip 200 is updated so that the BMS can enter sleep as long as the self-locking signal is canceled.

Figure 2:
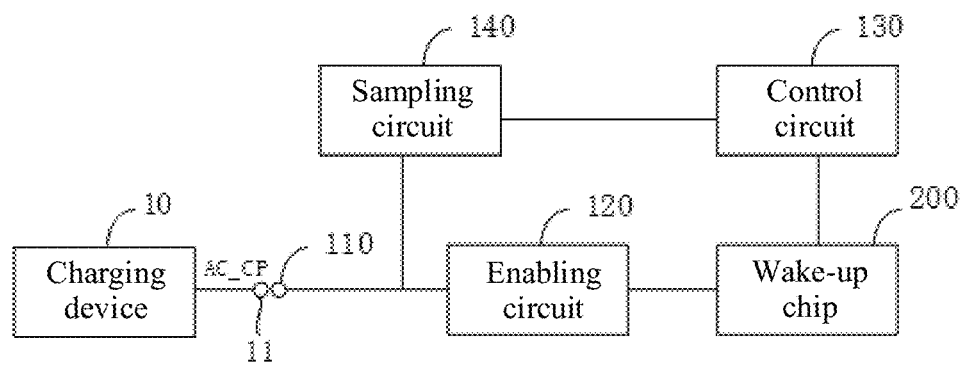
FIG. 2 is a module diagram of a BMS sleep wake-up circuit according to some embodiments of this application.
Figure 3:
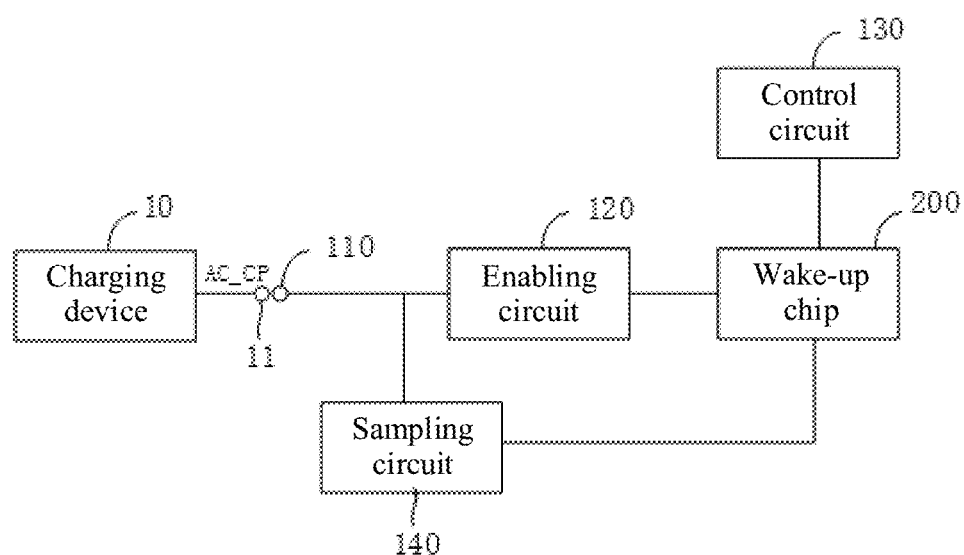
FIG. 3 is a module diagram of a BMS sleep wake-up circuit according to some embodiments of this application.

In some embodiments, referring to FIG. 2 and FIG. 3, FIG. 2 and FIG. 3 are module diagrams of a BMS sleep wake-up circuit according to some embodiments of this application. The BMS sleep wake-up circuit further includes a sampling circuit 140.

The sampling circuit 140 is connected to the detection port 110, and the sampling circuit 140 is configured to output an unplugging signal when it is detected that the detection port 110 is not connected to the charging device 10. The control circuit 130 or the wake-up chip 200 is further configured to configure, based on the unplugging signal, the wake-up chip 200 to recover from being enabled and activated by the second enabling signal to being enabled and activated by the first enabling signal.

The sampling circuit 140 detects an input charging gun plugged-in signal (for example, AC_CP interface) to identify a level or a PWM state for identifying a wake-up source (for example, charging gun) or a charging state. The unplugging signal may be a level signal, which is not limited herein.

This way is the same as that the activated wake-up chip 200 switches from being enabled and activated by the first enabling signal to being enabled and activated by the second enabling signal, and may be configured by the control circuit 130 or may be configured by the wake-up chip 200 itself. If this way is configured by the control circuit 130, as shown in FIG. 2, the sampling circuit 140 is connected to the control circuit 130, the control circuit 130 is connected to the wake-up chip 200, and the control circuit 130 configures the wake-up chip 200 to recover the enabled activation mode based on the unplugging signal. If this way is configured by the wake-up chip 200 itself, as shown in FIG. 3, the sampling circuit 140 is connected to the wake-up chip 200 to recover the enabled activation mode based on the unplugging signal.

The sampling circuit 140 is used to collect a collection signal of the detection port 110 to determine whether the charging device 10 is plugged in or unplugged. After it is detected that the charging device 10 is unplugged, the control circuit 130 or the wake-up chip 200 itself recovers the enabled activation mode of the wake-up chip 200 to a mode when the charging device 10 is not plugged in, and after the charging device 10 is be plugged in again, generates the first enabling signal to wake up the BMS in a sleeping state again.

Figure 4:
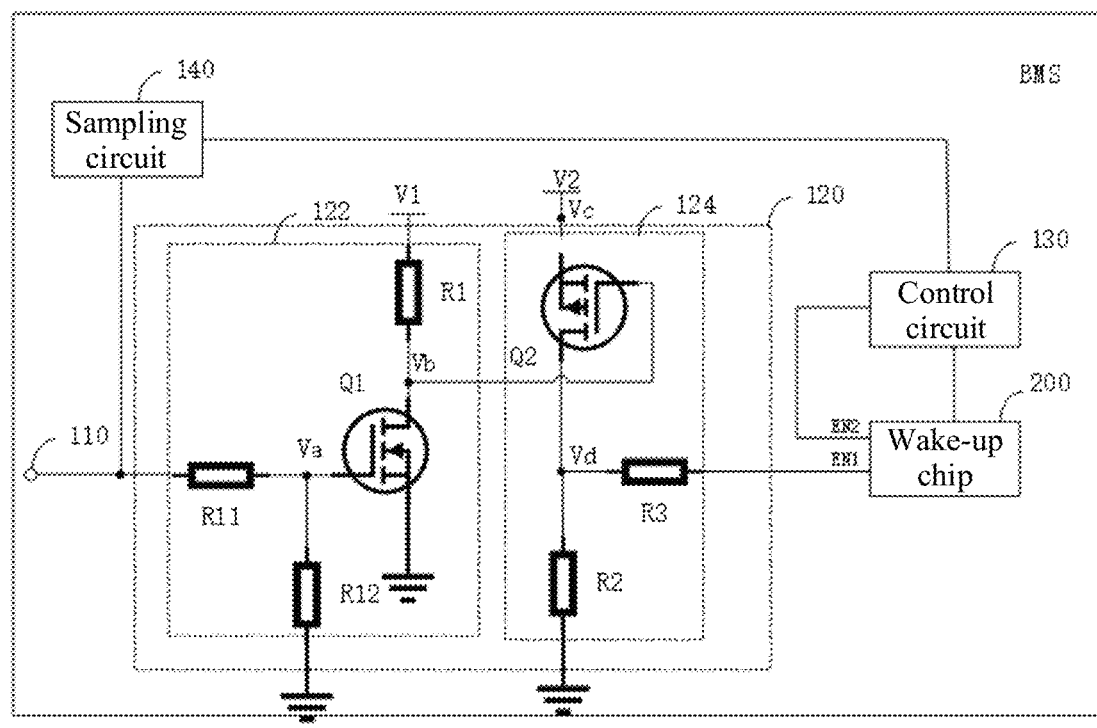
FIG. 4 is a circuit diagram of a BMS sleep wake-up circuit according to some embodiments of this application.

In some embodiments, referring to FIG. 4, FIG. 4 is a circuit diagram of a BMS sleep wake-up circuit according to some embodiments of this application.

The enabling circuit 120 includes a detection module 122 and an enabling module 124. The detection module 122 is connected to the detection port 110 and is configured to output a first detection signal based on the first level signal provided by the charging device 10. The enabling module 124 is connected to the detection module 122 and is configured to generate the first enabling signal based on the first detection signal and output the first enabling signal to the wake-up chip 200 of the BMS to enable the wake-up chip 200 to activate to wake up the BMS.

It can be understood that when the charging gun is unplugged, the detection module 122 is further configured to detect a second level signal (low level) and output a second detection signal (high level). The enabling module 124 is further configured to receive the second detection signal and output the second enabling signal (low level). For the wake-up chip 200 effectively triggered by the first enabling signal, the second enabling signal cannot enable and activate a wake-up signal. This circuit design is simple and reliable.

In some embodiments, referring to FIG. 3, FIG. 3 is a circuit diagram of a BMS sleep wake-up circuit according to some embodiments of this application. The detection module 122 includes a first switching transistor Q1 and a first resistor R1. A control terminal of the first switching transistor Q1 is connected to the detection port 110. A first terminal of the first switching transistor Q1 is connected to a first power source V1 through the first resistor R1. A second terminal of the first switching transistor Q1 is grounded. The first terminal of the first switching transistor Q1 is connected to the enabling module 124.

For example, the first switching transistor Q1 may be a semiconductor transistor that is turned on by a high level, for example, an N-channel MOS tube or IGBT. The control terminal, first terminal, and second terminal of the first switching transistor Q1 are respectively a gate, drain, and source of the MOS tube. In some embodiments, the detection module 122 further includes a first potential-divider resistor R11 and a second potential-divider resistor R12. The first potential-divider resistor R11 is connected in series between the detection port 110 and the control terminal of the first switching transistor Q1. The second potential-divider resistor R12 is connected between the control terminal of the first switching transistor Q1 and the ground. Through the resistance distribution of the first potential-divider resistor R11 and the second potential-divider resistor R12, a voltage Va at the control terminal of the first switching transistor Q1 presents a certain voltage under the input level of the detection port 110, which is used to drive the switching action of the first switching transistor Q1. This embodiment provides an implementation of the detection module 122, characterized by a simple circuit structure, reliability, and low cost.

In some embodiments, referring to FIG. 4, FIG. 4 is a circuit diagram of a BMS sleep wake-up circuit according to some embodiments of this application. The enabling module 124 includes a second switching transistor Q2 and a second resistor R2. A control terminal of the second switching transistor Q2 is connected to the detection module 122, a first terminal of the second switching transistor Q2 is connected to a second power source V2, a second terminal of the second switching transistor Q2 is grounded through the second resistor R2, and the second terminal of the second switching transistor Q2 is configured to be connected to a first enabling pin EN1 of the wake-up chip 200.

For example, the second switching transistor Q2 may be a low-level conductive semiconductor transistor, such as a P-channel MOS tube or an IGBT. The control terminal, first terminal, and second terminal of the second switching transistor Q2 are respectively a gate, source, and drain of the MOS tube. The second resistor R2 acts as a current-limiting component in the circuit after the second switching transistor Q2 is turned on. In some embodiments, the detection module 122 further includes a current-limiting resistor R3. The current-limiting resistor R3 is connected in series between the second terminal of the second switching transistor Q2 and the first enabling pin EN1 of the wake-up chip 200. The circuit has a simple structure, reliability, and low cost.

The first power source V1 and the second power source V2 may be common power sources on the BMS board, typically 3.3 volts (V) or 5 V, or may be level power sources suitable for the system.

In some embodiments, referring to FIG. 4, FIG. 4 is a circuit diagram of a BMS sleep wake-up circuit according to some embodiments of this application. The control circuit 130 includes one of control chips in the BMS, and a locking pin of the control chip is connected to a second enabling pin EN2 of the wake-up chip 200 to provide the self-locking signal.

The enabling circuit 120 and the control circuit 130 are connected to different enabling pins of the wake-up chip 200, so that the control of the enabling signal to the wake-up chip 200 and the control of the self-locking signal to the wake-up chip 200 are independent of each other. This allows the activated wake-up chip 200 to be locked by the self-locking signal output by the controller, and to change the enabled activation mode of the wake-up chip 200, to enable the wake-up chip 200 to be turned off after the self-locking signal is canceled, thereby achieving sleep and reducing the lead-acid consumption of the battery.

In some embodiments, the wake-up chip 200 is a power source chip for supplying power to the BMS, or a control chip for controlling the BMS to sleep or wake up. In some embodiments, the first enabling signal and the second enabling signal are level signals or edge signals with different states.

It can be understood that the wake-up chip 200 is a component in the BMS. An external high-level signal or low level enables and activates the wake-up chip 200 through the first enabling pin EN1, and then activates the entire BMS to start working. For example, a power source chip with level wake-up function, when receiving an external level signal (such as high level), outputs a voltage required by a back-end load, thereby allowing the entire BMS to start working. For example, a control chip with level wake-up function, when receiving an external level signal (such as high level), outputs a control signal of controlling the activation of the power source module, allowing the power source module to output a voltage required by a back-end load, thereby allowing the entire BMS to start working.

The BMS sleep wake-up circuit of this embodiment of this application can be compatible with a level-triggered and/or edge-triggered power source chip and control chip, so that the level-triggered and/or edge-triggered BMS can also be woken up and hibernated when the charging device 10 is plugged in.

In some embodiments, the control circuit 130 and the wake-up chip 200 are a same control chip. During working, after the control chip receives the first enabling signal through the first enabling pin EN1 and is enabled and activated, it generates the self-locking signal to the second enabling pin EN2 to maintain the working state. Additionally, to accommodate effective level-triggered wake-up, sleep can be achieved when the charging device 10 is in the plugged-in state, thereby updating an enabled activation mode of the first enabling pin EN1. After the charging device 10 is unplugged, the enabled activation mode of the first enabling pin EN1 is recovered.

In some embodiments, referring to FIG. 4, when the charging device 10 is not plugged in, that is, when the communication interface 11 of the charging device 10 in FIG. 1 is not connected, Va=0 V (that is, Va<a gate-source threshold voltage Vgsth of Q1), the first switching transistor Q1 is in a cut-off state; Vb=V1=Vc, that is, Vb−Vc=0 (that is, Vb−Vc>Vgsth of Q2), the second switching transistor Q2 is in a cut-off state, so Vd=0 V. At this point, the first enabling pin EN1 of the wake-up chip 200 receives a low level, and the BMS is in a non-activated sleeping state.

When the charging device 10 is plugged in, that is, when the communication interface 11 of the charging device 10 in FIG. 1 is connected, due to the high level input of the detection port 110, the first switching transistor Q1 is turned on (that is, Va>Vgsth of Q1). After the first switching transistor Q1 is turned on, Vb changes from high level to low level (that is, Vb=0 V), at which point Vb−Vc=−V1, causing the second switching transistor Q2 to be turned on (that is, Vb−Vc<Vgsth of Q2). At this point, Vd changes from low level to high level, is input to the first enabling pin EN1 of the wake-up chip 200, which triggers the wake-up chip to activate, thereby activating the entire BMS to start working. The control circuit 130 (for example, an MCU), which starts working, outputs a self-locking signal to maintain the BMS in an awakened state. Additionally, through configuration, the first enabling pin EN1 of the wake-up chip 200 is updated from being effectively triggered by a high level to being effectively triggered by q low level for wake-up. When charging is completed or stopped, and the charging device 10 remains plugged in and not unplugged (that is, the communication interface 11 is in a constant high-level state), as the first enabling pin EN1 of the wake-up chip 200 has been configured and updated to be effective at a low level, Vd is constantly high and will not wake up the wake-up chip 200, allowing the BMS to enter sleep normally.

After the charging device 10 is unplugged, Va changes from high level to low level, the first switching transistor Q1 is cut off (that is, Va=0<Vgsth of Q1), and Vb changes from high level to low level (that is, Vb=V1). At this point, Vb−Vc=0>Vgsth of Q2, the second switching transistor Q2 is cut off, and Vd changes to low level. Vd is then input as a low level to the first enabling pin EN1 of the wake-up chip 200 to wake up the entire BMS. The sampling circuit 140 detects an input signal of the detection port 110 and determines that the charging device 10 has been unplugged (in other words, the communication interface 11 is in a constant low-level state). The first enabling pin EN1 of the wake-up chip 200 is then updated and configured to be effective at a high level. Thus, a wake-up and sleep function workflow for the charging interface with an external input of a high level is completed.

Figure 5:
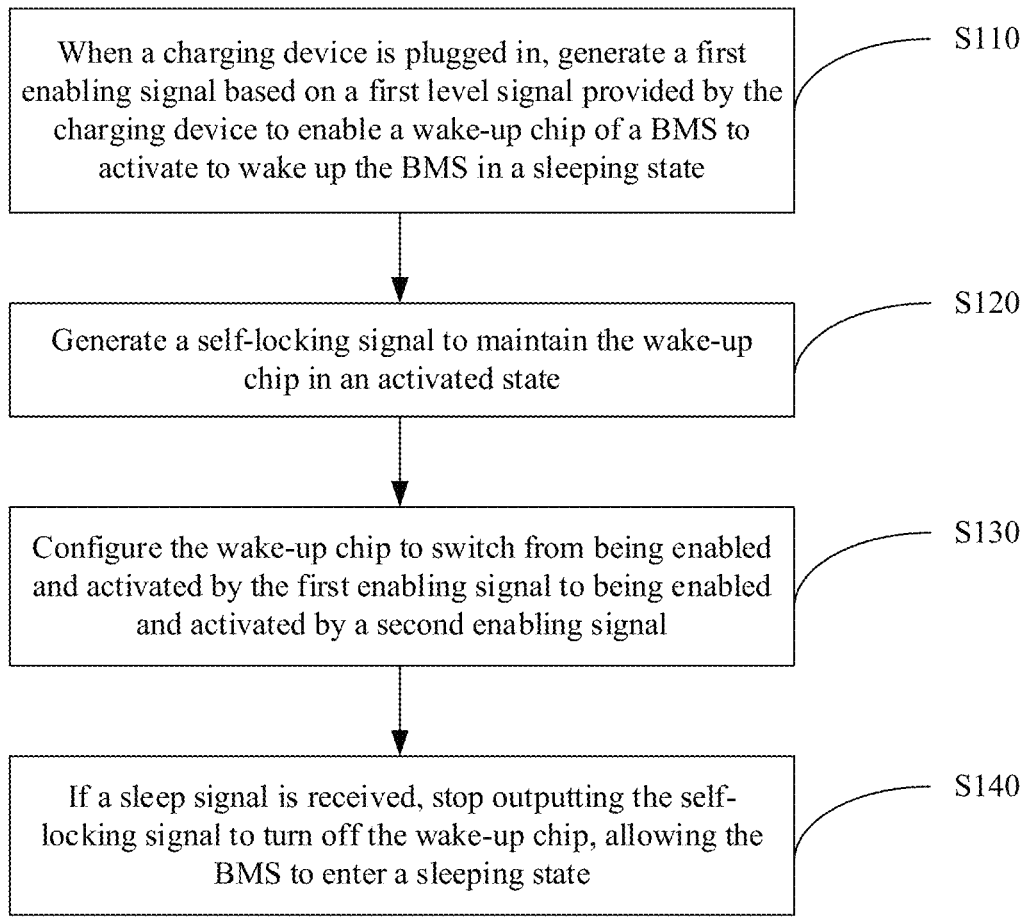
FIG. 5 is a flowchart of a BMS sleep wake-up method according to some embodiments of this application.

According to a second aspect, referring to FIG. 5, FIG. 5 is a flowchart of a BMS sleep wake-up method according to some embodiments of this application with reference to FIG. 1 to FIG. 4. An embodiment of this application provides a BMS sleep wake-up method, including the following steps.

Step S110: When a charging device is plugged in, generate a first enabling level based on a first level signal provided by the charging device to enable a wake-up chip of a BMS to activate to wake up the BMS in a sleeping state.

Step S120: Generate a self-locking signal to maintain the wake-up chip in an activated state.

Step S130: Configure the wake-up chip to switch from being enabled and activated by the first enabling signal to being enabled and activated by a second enabling signal.

Step S140: If a sleep signal is received, stop outputting the self-locking signal to turn off the wake-up chip, allowing the BMS to enter a sleeping state.

In the technical solution of this embodiment of the application, when the charging device 10 is plugged in, the BMS may generate the first enabling signal based on the first level signal provided by the charging device 10 to enable the wake-up chip 200 to activate to wake up the BMS in a sleeping state, and output the self-locking signal to keep the wake-up chip 200 waking up the BMS. Additionally, after the wake-up chip 200 is activated, the enabled activation mode of the wake-up chip 200 is changed to be enabled by the second enabling signal to enable the wake-up chip 200 to wake up the BMS in a sleeping state. In this way, when the charging device 10 remains plugged in, the wake-up chip 200 is not awakened by the original first enabling signal, and after the self-locking signal is canceled, the wake-up chip 200 is turned off, allowing the BMS to enter the sleeping state, solving the problem that the BMS cannot enter the sleeping state unless the charging device 10 is unplugged. Furthermore, the wake-up chip 200 triggered by either an edge or a level can allow the BMS to enter sleep when the charging device 10 is plugged in, thus reducing the lead-acid consumption of the battery.

Figure 6:
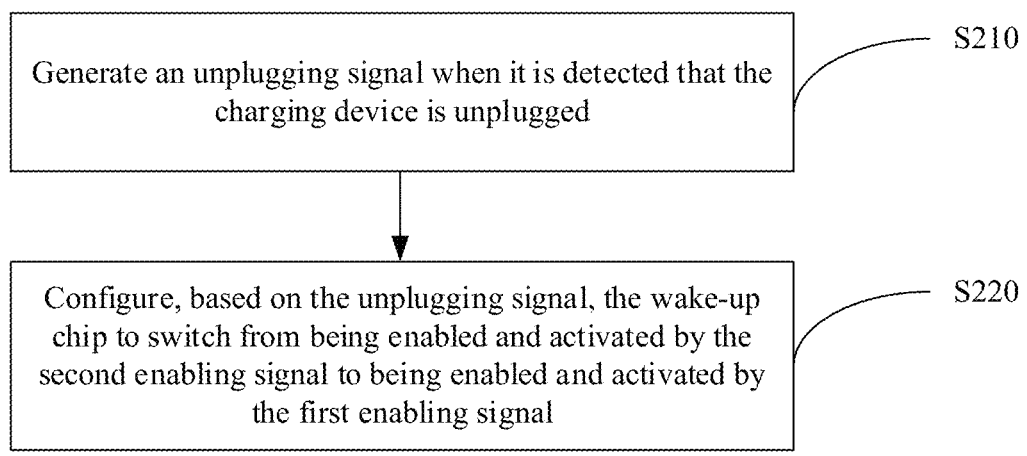
FIG. 6 is a flowchart of a BMS sleep wake-up method according to some embodiments of this application.

In some embodiments, referring to FIG. 6, FIG. 6 is a flowchart of a BMS sleep wake-up method according to some embodiments of this application with reference to FIG. 2 and FIG. 3. The method further includes the following steps.

Step S210: Generate an unplugging signal when it is detected that the charging device is unplugged.

Step S220: Configure, based on the unplugging signal, the wake-up chip to switch from being enabled and activated by the second enabling signal to being enabled and activated by the first enabling signal.

In the technical solution of this embodiment of this application, a connection signal of the detection port 110 is detected to determine whether the charging device 10 is plugged in or unplugged. After it is detected that the charging device 10 is unplugged, the enabled activation mode of the wake-up chip 200 is changed to a mode when the charging device 10 is not plugged in, and after the charging device 10 is plugged in again, the first enabling signal is generated to wake up the BMS in a sleeping state again, providing system reliability.

In some embodiments, the first enabling signal and the second enabling signal are level signals or edge signals.

In the technical solution of this embodiment of the application, the BMS can support being triggered by a level and/or an edge, so that the level-triggered and/or edge-triggered BMS can also be awakened and enter sleep when the charging device 10 is plugged in.

According to a third aspect, referring to FIG. 4, this application provides a BMS, including the foregoing BMS sleep wake-up circuit.

In the technical solution of this embodiment of the application, when the charging device 10 is plugged in, the BMS may use the level signal provided by the charging device 10 to enable the wake-up chip 200 to activate to wake up the BMS in a sleeping state, and the activated BMS outputs the self-locking signal to keep awake. Additionally, after activation, the enabled activation mode is changed so that the BMS cannot be awakened by the original enabling signal when the charging device 10 remains plugged in. After the self-locking signal canceled, the BMS can enter the sleeping state, solving the problem that the BMS cannot enter a sleeping state unless the charging device 10 is unplugged, thereby reducing the lead-acid consumption of the battery.

According to a fourth aspect, this application provides an electric device, including a battery and the foregoing BMS.

The electric device may be a new energy electric vehicle, a cleaning robot, an energy storage device, or the like. In the technical solution of this embodiment of this application, when a charging device 10 is plugged in, the electric device can use a level signal provided by the charging device 10 to enable the wake-up chip 200 to activate to wake up the BMS in a sleeping state of the electric device, and the activated BMS outputs a self-locking signal to keep awake. Additionally, after being activated, the enabled activation mode is changed so that the BMS cannot be awakened by the original enabling signal when the charging device 10 remains plugged in, and can enter a sleeping state after the self-locking signal is canceled, solving the problem that the BMS cannot enter a sleeping state unless the charging device 10 is unplugged, thereby reducing the lead-acid consumption of the battery.

The foregoing description is merely an overview of the technical solution of this application. To more clearly understand the technical means in this application so that they can be implemented according to the content of the specification, and to make the foregoing and other objectives, features, and advantages of this application more obvious and easier to understand, the following describes specific embodiments of this application.

In conclusion, it should be noted that the foregoing embodiments are for description of the technical solutions of this application only rather than for limiting this application. Although this application has been described in detail with reference to the foregoing embodiments, persons of ordinary skill in the art should appreciate that they can still make modifications to the technical solutions described in the embodiments or make equivalent replacements to some or all technical features thereof without departing from the scope of the technical solutions of the embodiments of this application. All such modifications and equivalent replacements shall fall within the scope of claims and specification of this application. In particular, as long as there is no structural conflict, the various technical features mentioned in the embodiments can be combined in any manner. This application is not limited to the specific embodiments disclosed in this specification but includes all technical solutions falling within the scope of the claims.

The invention claimed is:

1. A BMS sleep wake-up circuit, comprising:
a detection port configured to be connected to a charging device when the charging device is plugged in;
an enabling circuit connected to the detection port and a wake-up chip of a BMS, and configured to generate a first enabling signal based on a first level signal provided by the charging device to enable the wake-up chip to activate to wake up the BMS in a sleeping state, wherein the activated wake-up chip is configured to switch from being enabled and activated by the first enabling signal to being enabled and activated by a second enabling signal; and a control circuit configured to, after the BMS is awakened, output a self-locking signal to the wake-up chip to maintain the wake-up chip in an activated state, and further configured to, when a sleep signal is received, stop outputting the self-locking signal to turn off the wake-up chip, allowing the BMS to enter a sleeping state.

2. The BMS sleep-wake circuit according to claim 1, wherein the control circuit or the wake-up chip is further configured to configure the activated wake-up chip to switch from being enabled and activated by the first enabling signal to being enabled and activated by the second enabling signal.

3. The BMS sleep wake-up circuit according to claim 1, further comprising:
a sampling circuit connected to the detection port, wherein the sampling circuit is configured to output an unplugging signal when it is detected that the detection port is not connected to the charging device; and
the control circuit or the wake-up chip is further configured to configure, based on the unplugging signal, the wake-up chip to recover from being enabled and activated by the second enabling signal to being enabled and activated by the first enabling signal.

4. The BMS sleep wake-up circuit according to claim 1, wherein the enabling circuit comprises:
a detection module connected to the detection port, and configured to output a first detection signal based on the first level signal provided by the charging device; and
an enabling module connected to the detection module, and configured to generate the first enabling signal based on the first detection signal and output the first enabling signal to the wake-up chip.

5. The BMS sleep wake-up circuit according to claim 4, wherein the detection module comprises a first switching transistor and a first resistor, wherein a control terminal of the first switching transistor is connected to the detection port, a first terminal of the first switching transistor is connected to a first power source through the first resistor, a second terminal of the first switching transistor is grounded, and a first terminal of the first switching transistor is connected to the enabling module.

6. The BMS sleep wake-up circuit according to claim 4, wherein the enabling module comprises a second switching transistor and a second resistor, wherein a control terminal of the second switching transistor is connected to the detection module, a first terminal of the second switching transistor is connected to a second power source, a second terminal of the second switching transistor is grounded through the second resistor, and a second terminal of the second switching transistor is configured to be connected to a first enabling pin of the wake-up chip.

7. The BMS sleep wake-up circuit according to claim 1, wherein the control circuit comprises one of control chips in the BMS, and a locking pin of the control chip is connected to a second enabling pin of the wake-up chip to provide the self-locking signal.

8. The BMS sleep wake-up circuit according to claim 7, wherein the wake-up chip is a power source chip for supplying power to the BMS, or a control chip for controlling the BMS to sleep or wake up.

9. The BMS sleep wake-up circuit according to claim 1, wherein the first enabling signal and the second enabling signal are level signals or edge signals with different states.

10. The BMS sleep wake-up circuit according to claim 1, wherein the control circuit and the wake-up chip are a same control chip.

11. A BMS, comprising the BMS sleep wake-up circuit according to claim 1.

12. An electric device, comprising a battery, and further comprising the BMS according to claim 11.

13. A BMS sleep wake-up method, comprising:
when a charging device is plugged in, generating a first enabling level based on a first level signal provided by the charging device to enable a wake-up chip of a BMS to activate to wake up the BMS in a sleeping state;
generating a self-locking signal to maintain the wake-up chip in an activated state;
configuring the wake-up chip to switch from being enabled and activated by the first enabling signal to being enabled and activated by the second enabling signal; and
when a sleep signal is received, stopping outputting the self-locking signal to turn off the wake-up chip, allowing the BMS to enter a sleeping state.

14. The BMS sleep wake-up method according to claim 13, further comprising:
generating an unplugging signal when it is detected that the charging device is unplugged; and
configuring, based on the unplugging signal, the wake-up chip to recover from being enabled and activated by the second enabling signal to being enabled and activated by the first enabling signal.

15. The BMS sleep wake-up method according to claim 13, wherein the first enabling signal and the second enabling signal are level signals or edge signals.

* * * * *